(12) United States Patent
Paul et al.

(10) Patent No.: US 7,951,865 B1
(45) Date of Patent: May 31, 2011

(54) THERMOPLASTIC RESIN COMPOSITIONS SUITABLE FOR USE IN TRANSPARENT LAMINATES

(75) Inventors: John W. Paul, Beaumont, TX (US); C. Anthony Smith, Vienna, WV (US); Jerrel C. Anderson, Vienna, WV (US); Stephen J. Bennison, Wilmington, DE (US); Sam L. Samuels, Landenberg, PA (US); Steven C. Pesek, Orange, TX (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/821,487

(22) Filed: Jun. 23, 2010

Related U.S. Application Data

(63) Continuation of application No. 11/263,015, filed on Oct. 31, 2005, now Pat. No. 7,763,360.

(60) Provisional application No. 60/623,479, filed on Oct. 29, 2004.

(51) Int. Cl.
| | |
|---|---|
| *C08L 31/00* | (2006.01) |
| *B32B 27/00* | (2006.01) |
| *B32B 15/08* | (2006.01) |
| *B32B 27/30* | (2006.01) |

(52) U.S. Cl. ........ 524/556; 428/500; 428/441; 428/192; 428/522; 428/461; 526/317.1

(58) Field of Classification Search ............. 428/500, 428/441, 522, 461, 192, 426; 526/317.1; 524/556
See application file for complete search history.

(56) References Cited

U.S. PATENT DOCUMENTS

| | | | |
|---|---|---|---|
| 3,344,014 A | 9/1967 | Rees | |
| 3,404,134 A | 10/1968 | Rees | |
| 4,173,669 A | 11/1979 | Ashida et al. | |
| 4,663,228 A | 5/1987 | Bolton et al. | |
| 4,668,574 A | 5/1987 | Bolton et al. | |
| 5,344,513 A | 9/1994 | Takenaka | |
| 5,387,635 A | 2/1995 | Rowland et al. | |
| 5,580,057 A | 12/1996 | Sullivan et al. | |
| 5,759,698 A | 6/1998 | Tanuma et al. | |
| 5,763,062 A | 6/1998 | Smith et al. | |
| 5,895,721 A | 4/1999 | Naoumenko et al. | |
| 6,150,028 A | 11/2000 | Mazon | |
| 6,238,801 B1 | 5/2001 | Naoumenko et al. | |
| 6,432,522 B1 | 8/2002 | Friedman et al. | |
| 6,737,151 B1 * | 5/2004 | Smith | 428/192 |
| 6,852,792 B1 | 2/2005 | Capendale et al. | |
| 2002/0155302 A1 | 10/2002 | Smith et al. | |
| 2003/0044579 A1 | 3/2003 | Bolton et al. | |
| 2003/0124296 A1 | 7/2003 | Smith | |
| 2007/0289693 A1 | 12/2007 | Anderson et al. | |
| 2008/0044666 A1 | 2/2008 | Anderson et al. | |

FOREIGN PATENT DOCUMENTS

| | | |
|---|---|---|
| WO | WO 99/58334 | 11/1999 |
| WO | WO 9958334 A2 * | 11/1999 |
| WO | WO 00/63309 | 10/2000 |
| WO | WO 00/64670 | 11/2000 |
| WO | WO 2004/011755 | 2/2004 |

OTHER PUBLICATIONS

Longworth, R., Thermoplastic Ionic Polymers: Ionomers, Ionic Polymers (L. Holliday, ed.), Halstead, New York, Ch. 2 (1975). See in particular pp. 135 to 162.

Morris, B.A., Chen, J.C., The Stiffness of Ionomers: How It is Achieved and Its Importance to Flexible Packaging Applications, SPE ANTEC, 61 (vol. 3), 3157 (2003).

PCT International Search Report, International Application No. PCT/US2005/039328, Filed Oct. 31, 2005.

\* cited by examiner

*Primary Examiner* — Michael M Bernshteyn
(74) *Attorney, Agent, or Firm* — Maria M. Kourtakis; Kelly Law Registry

(57) ABSTRACT

The present invention is an improved polymeric resin composition comprising or consisting essentially of from about 70 wt % to about 79 wt % units derived from ethylene and from about 21 wt % to about 30 wt % units derived from an α,β-unsaturated carboxylic acid having from 3 to 8 carbons. Resins of the present invention are particularly suitable for preparing transparent laminates useful as glazing elements that provide a greater measure of safety than non-laminated glazing elements. Laminates of the present invention have 3% haze or less without the addition of amines.

3 Claims, No Drawings

THERMOPLASTIC RESIN COMPOSITIONS SUITABLE FOR USE IN TRANSPARENT LAMINATES

CROSS-REFERENCES TO RELATED APPLICATIONS

This application claims the benefit of U.S. Application No. 60/623,479, filed Oct. 29, 2004, and of U.S. application Ser. No. 11/263,015, filed on Oct. 31, 2005, now allowed, each of which is incorporated herein by reference in its entirety.

FIELD OF THE INVENTION

The present invention relates to transparent laminate articles. More specifically, the present invention relates to resin compositions suitable for use as an intermediate layer in transparent laminate articles.

BACKGROUND OF THE INVENTION

Glass laminated products have contributed to society for almost a century. Beyond the well known, every day automotive safety glass used in windshields, glass laminates are used in most forms of the transportation industry. They are utilized as windows for trains, airplanes, ships, and nearly every other mode of transportation. Safety glass is characterized by high impact and penetration resistance and does not scatter glass shards and debris when shattered. Glass laminates find widespread use in architectural applications, as well.

Safety glass typically consists of a sandwich of two glass sheets or panels bonded together with an interlayer of a polymeric film or sheet which is placed between the two glass sheets. One or both of the glass sheets may be replaced with optically clear rigid polymeric sheets such as, for example, sheets of polycarbonate materials. Safety glass has further evolved to include multiple layers of glass and/or polymeric sheets bonded together with interlayers of polymeric films or sheets.

The interlayer is typically made with a relatively thick polymer film or sheet that exhibits toughness and adheres to the glass in the event of a crack or crash. Over the years, a wide variety of polymeric interlayers have been developed to produce laminated products. In general, it is desirable that these polymeric interlayers possess acceptable levels of: optical clarity (haze of less than 4%), impact resistance, penetration resistance, ultraviolet light resistance, long term thermal stability, adhesion to glass and/or other rigid polymeric sheets, ultraviolet light transmittance, moisture absorption, moisture resistance, long term weatherability, among other characteristics. Widely used interlayer materials include complex multi-component compositions comprising polymers such as: polyvinylbutyral (PVB); polyurethane (PU); polyvinylchloride (PVC); metallocene-catalyzed linear low density polyethylenes; ethylenevinyl acetate (EVA); ethylene acid copolymer ionomers; polymeric fatty acid polyamides; polyester resins such as poly(ethylene terephthalate); silicone elastomers; epoxy resins; elastomeric polycarbonates; and the like. Acid copolymers have become more widespread in their use for fabricating transparent laminates.

U.S. Pat. No. 3,344,014 discloses laminated glass products with an ethylene copolymer ionomer interlayer. U.S. Pat. No. 3,404,134 discloses a process of ionically crosslinking certain copolymers which contain carboxylic acids. U.S. Pat. No. 4,663,228 and U.S. Pat. No. 4,668,574 each discloses a transparent laminated article which includes a water insoluble ionomer resin film comprising the metal salt of an ionomer resin prepared from ethylene and methacrylic acid monomers. U.S. Pat. No. 5,344,513 discloses a method for manufacturing a laminated transparent substrate which includes an ethylene copolymer ionomer interlayer. U.S. Pat. No. 5,759,698 discloses laminated glass which includes an interlayer comprising an ionomer resin of ethylene-methacrylic acid copolymer with a metal ion which has been thermoset with an organic peroxide and a silane coupling agent. U.S. Pat. No. 5,763,062 discloses a transparent article comprising an extruded ionomer resin film or sheet having a carboxylic acid content of between about 17 and 40 weight percent, said ionomer resin being essentially free of amines. U.S. Pat. No. 5,895,721 and U.S. Pat. No. 6,238,801 each discloses a glazing which includes a transparent layer of an ionomer resin with improved adhesion through the use of a metal chelate. U.S. Pat. No. 6,150,028 discloses glass laminates which include ionomer resin interlayers and glass with solar control characteristics. U.S. Pat. No. 6,432,522 discloses optically transparent glazing which include interlayers comprising ethylene methacrylic acid which incorporate 15 to 17 weight percent and was partially neutralized with sodium. U.S. Patent Application No. 2002/0155302 discloses a method for preparing a transparent laminated article which includes an interlayer comprising a copolymer of an olefin with 13 to 21 weight percent of methacrylic or acrylic acid monomers partially neutralized with an alkali cation. U.S. Patent Application No. 2003/0044579 discloses a method for preparing a transparent laminated article which includes an interlayer comprising a copolymer of an olefin with 13 to 22 weight percent of methacrylic or acrylic acid monomers partially neutralized with an alkali cation. WO 99/58334 discloses transparent laminates which comprise a polymer of ethylene and methacrylic acid or acrylic acid containing about 14 to 24 weight percent of the acid and having about 10 to 80 percent of the acid neutralized with a metallic ion. WO 00/64670 discloses transparent laminates which comprise a polymer of ethylene and methacrylic acid or acrylic acid containing about 14 to 24 weight percent of the acid and having about 10 to 80 percent of the acid neutralized with a metallic ion. WO 2004/011755 discloses transparent laminates which comprise a polymer of ethylene and methacrylic acid or acrylic acid containing about 14 to 28 weight percent of the acid and having about 20 to 60 percent of the acid neutralized with a metallic ion.

The evolution of the product markets, however, requires even greater adhesion of the interlayer to the glass or rigid material in a laminate. Conventional teaching suggests that one way to increase adhesion in an acid copolymer interlayer is to increase the acid content of the copolymer resin. There are problems with this approach, however. One problem is that high acid resins having acid content of greater than 20 wt % are not available commercially. Also, it is known that certain copolymer resins that have high acid content can have an increased tendency to self-adhere. This can make manufacture and processing of high acid resins difficult, or at least more costly as measures have to be taken to avoid product losses from self-adhesion. For example, storing high acid resin in a refrigerated container, or alternatively the use of slip agents or antiblock additives, could be desirable.

Another problem with using higher acid resins than are commercially available is that it is well known that as adhesion properties increase, the impact toughness of the laminate can deteriorate. Therefore adhesion has heretofore been controlled to a level where the impact performance is acceptable. That is, a balance between adhesion and impact toughness in the laminate has been struck to obtain a commercially viable product offering. Generally this is accomplished by using adhesion control additives in some interlayer materials, or by increasing the level of neutralization in an acid copolymer. Manipulating the neutralization level in an acid copolymer ionomer can cause other property changes, as well. Demands for increased adhesion, therefore, are not easily addressed in a conventional manner due to the expected decrease in impact toughness of the laminates upon increasing the acid content of the interlayer material and other changes that can result.

Further, it has become more desirable that the toughness of certain conventional polymeric interlayers be improved over that of current commercially available resins. As is easily recognized by one of ordinary skill in the art, modifying the intrinsic properties of a resin used in preparing interlayers for transparent laminates can affect other properties of the resin and interlayers produced therefrom. Recognizing this fact, changing the acid level, the neutralization level, or other intrinsic characteristics is not straightforward.

Even more problematical, however, is the fact that commercially available acid copolymer resins need to be cooled quickly in order to provide laminates with desirable optical clarity, which are therefore useful as transparent laminate articles. The recommended cooling rate for laminates comprising conventional acid copolymer ionoplast resins is at least 5° F. per minute (2.78° C./min) or greater. In other words, by way of illustration, it is recommended that a laminate prepared using conventional conditions and a conventional ionoplast resin as interlayer material be cooled from an autoclave temperature of 275° F. (135° C.) to a temperature of 104° F. (40° C.) in less than about 35 minutes. In a practical sense this is not a trivial process condition to meet, however, because manufacturing processes are typically carried out under less than ideal conditions. This can be a problem because laminates comprising conventional ionoplast interlayers exhibit a tendency towards increased haze as the cooling rate is decreased. Differences in equipment and processing conditions can cause variation in product quality, even when carried out in the same facilities. The sensitivity of the optical clarity of an ionoplast interlayer to the cooling rate can be a problem in the manufacture of transparent laminates.

It can be desirable to have an improved resin composition for the purpose of increasing adhesion to rigid substrates, particularly adhesion to glass. It can be even more desirable to have such a resin provide a laminate with at least the same, or preferably with improved impact resistance and toughness. Further, it can be desirable to prepare such a resin wherein an interlayer sheet produced from the resin has improved toughness relative to conventional interlayers. Moreover, it can be desirable to have all of these properties in a laminate that provides good optical clarity when designed for uses where optical clarity is a requirement.

SUMMARY OF THE INVENTION

In one aspect, the present invention is an ethylene acid copolymer resin composition suitable for use in the manufacture of a transparent laminate article, wherein: (i) the composition consists essentially of from about 70 to about 79 wt % ethylene and from about 21 to about 30 wt % of a carboxylic acid monomer selected from acids in the group consisting of α,β-unsaturated acids having from 3 to 8 carbons, wherein at least about 20% to about 35% of the acid groups are neutralized; and (ii) the resin has a melt index of about 60 g/10 min or less prior to neutralization.

In another aspect, the present invention is a transparent interlayer obtained from a resin composition consisting essentially of from about 70 to about 79 wt % of ethylene and from about 21 to about 30 wt % of a carboxylic acid monomer selected from acids in the group consisting of α,β-unsaturated acids having from 3 to 8 carbons, wherein at least about 20% to about 35% of the acid groups are neutralized; and (ii) the resin has a melt index of about 60 g/10 min or less prior to neutralization.

In another aspect, the present invention is a laminate article comprising at least one transparent interlayer, wherein the interlayer is obtained from a resin composition consisting essentially of from about 70 to about 79 wt % of ethylene and from about 21 to about 30 wt % of a carboxylic acid monomer selected from acids in the group consisting of α,β-unsaturated acids having from 3 to 8 carbons, wherein at least about 20% to about 35% of the acid groups are neutralized; and (ii) the resin has a melt index of about 60 g/10 min or less prior to neutralization, and wherein the laminate has a haze of about 3% or less.

In still another aspect, the present invention is a process for preparing a transparent laminate article having a haze of about 3% or less comprising an interlayer, the process comprising the steps of:

(a) extruding at a temperature of from about 175° C. to about 250° C., an interlayer sheet obtained from a thermoplastic resin, wherein (i) the resin consists essentially of from about 70 to about 79 wt % of ethylene and from about 21 to about 30 wt % of a carboxylic acid monomer selected from acids in the group consisting of α,β-unsaturated acids having from 3 to 8 carbons, wherein at least about 20% to about 35% of the acid groups are neutralized and (ii) the resin has a melt index of about 60 g/10 min or less prior to neutralization; (b) fabricating a laminate from the interlayer by (1) setting up the interlayer and at least one other laminate layer to form a pre-laminate assembly and (2) heating the pre-laminate assembly to a temperature of at least about 120° C. and applying pressure or vacuum to the assembly for a period of time and (3) cooling the laminate to obtain the transparent laminate.

DETAILED DESCRIPTION OF THE INVENTION

In one embodiment, the present invention is an improved ionoplast resin composition, particularly suitable for use in the manufacture of transparent laminates. An ionoplast resin of the present invention is a an ethylene acid copolymer resin consisting essentially of copolymerized units of ethylene and from about 21 wt % to about 30 wt % of an α,β-unsaturated carboxylic acid having from 3 to 8 carbons. It should be understood for the purposes of the present application that control of the final acid level in a copolymer of the present invention is not exact, and therefore the range of acid in a final product can vary within about ±1 wt % of the disclosed ranges without departing from the intended scope of the present invention.

Depending on the performance properties, manufacturing capabilities, or desirable process parameters, various acid levels can be preferred. For example, in some cases an acid level of about 21 wt % (that is 21±1 wt %) can be preferred, in other cases it can be preferred to have an acid level of about 22±1 wt %.

The improvement comprises a resin that provides improved adhesion to glass owing to the increased acid level, but without detracting from the toughness and impact resistance of the laminate. The ionoplast resins are at least partially neutralized, and exist as partial salts comprising metal ions selected from ions in the group consisting of alkaline and alkaline earth metal ions, and transition metal ions. The ionoplast resins of the present invention have from about 10% to about 90% of the carboxylic acid groups neutralized. Preferably, the ionoplast resins of the present invention are from about 15% to about 45% neutralized, and more preferably from about 20% to about 35% neutralized. Even more preferably, the resin is from about 25% to about 35% neutralized.

The resins of the present invention, when used to prepare a laminate of the present invention, exhibit improved toughness relative to what would be expected of a laminate comprising a higher acid content in the interlayer as described herein. Without being held to theory, it is believed that improved toughness in the present invention is obtained by preparing an ethylene copolymer base resin with a lower melt index (MI) before it is neutralized. A base resin of the present invention has a MI of less than 60 grams/10 min as determined at 190° C., and preferably less than 55 grams/10 min. More preferably the MI is less than 50 grams/10 min. Even more preferably the MI is less than 35 grams/10 min. After neutralization, the MI can be less than 2.5 grams/10 min, and possibly less than 1.5 g/10 min.

To aid in storage, processing or handling, ionomers of the present invention may also comprise an agent to prevent blocking. The use of anti-block agents or processing aids is optional in the practice of the present invention, but preferred. Conventional anti-blocking agents can be used, and one of ordinary skill in the art can determine whether such agents are desirable.

In another embodiment, the present invention is sheet or film obtained from a resin of the present invention. A sheet or film of the present invention can be obtained, for example, by extruding the resin of the present invention using conventional means. Extrusion can be used to provide sheets of thickness ranging from about 0.38 to about 2.60 mm. To obtain films from a resin of the present invention, conventional methods can be used such as casting or blowing a film from the molten resin. For laminates of interest in the practice of the present invention, extrusion of an interlayer sheet is preferred. Extrusion of an interlayer of the present invention can be carried out at a temperature in the range of from about 175° C. to about 250° C. An interlayer sheet of the present invention can be extruded without a surface pattern, but it is preferred that an interlayer of the present invention have a surface pattern to facilitate the process of removing air or gaseous vapors from the interfacial spaces of the laminate as it is fabricated. The surface pattern can be applied either by known melt fracture techniques, or by use of an embossing tool. The optical clarity of an interlayer comprising a surface pattern is poor relative to the transparent laminate that is eventually obtained from the interlayer. The lamination process restores the optical clarity to the interlayer.

In another embodiment, the present invention is a laminate prepared from an extruded sheet comprising a resin of the present invention. In the glass laminating art, it is known that increased adhesion to glass can result in a laminate with diminished impact resistance. The resins of the present invention have improved adhesion but also have improved impact resistance, owing to the lower melt index of the improved resins relative to the conventional resins. Adhesion to glass of the presently claimed resins, as measured by Double-Cantilever Beam (DCB) testing, is greater than 200 J/m$^2$ for laminates obtained using the presently claimed resins, and yet these laminates exhibit impact toughness of greater than about 300 kJ/m$^2$. Preferably, the DCB adhesive strength is within the range of from about 200 to about 1200 J/m$^2$. Peel strength of laminates of the presently claimed invention is greater than about 6 lbs/inch to about 20 lbs/inch.

Finding a proper balance between adhesion and impact toughness in the manufacture of glass laminates comprising ionoplast resins is a goal of the present invention. Toughness of the laminate can be determined by measuring the impact toughness, particularly the impact penetration. The laminates of the present invention generally provide greater penetration resistance than conventional laminates.

Interlayers of the present invention can be laminated to glass or other transparent materials according to known and conventional methods. For example, an interlayer of the present invention can be assembled with at least one other laminate structural layer, such as glass, and laminated to the glass in an autoclave at a temperature above the softening point of the interlayer. Typically, for an ionoplast interlayer, the autoclave temperature can be at least about 120° C. Preferably the autoclave temperature is at least about 125° C., and more preferably at least about 130° C.

In another embodiment, the present invention is a lamination process wherein a high acid resin can be laminated at a temperature of less than 120° C., preferably less than 110° C., to obtain a laminate wherein the adhesion of the laminate is at least as high as that in a laminate obtained from a conventional ethylene copolymer ionomer having less than about 20 wt % acid, and which requires lamination temperatures at or above 120° C. The possibility for relatively low temperature lamination provides for the development of alternate lamination processes, such as for example press-heating, pulse heating, or pass-through oven heating, is present with interlayers of the present invention.

An interlayer suitable for use herein preferably comprises a surface pattern prior to lamination that facilitates removal of air or trapped vapors and gasses that may otherwise be trapped in the interface between the layers of the laminate. Vacuum or pressure can be applied to the laminate assembly to promote adhesion to glass and/or force out trapped gasses.

In another embodiment of the present invention, the lamination can be carried out at atmospheric pressure by application of heat and roll pressure from a nip roll, for example, or other mechanical pressure to the laminate assembly as it is heated. One of ordinary skill in the art of lamination will know how to carry out the lamination to obtain a laminate of the present invention by using the teachings of this application together with those known and practiced in the conventional art. The laminate thus obtained can be cooled to ambient temperatures at a cooling rate of at least about 5° F./min (2.78° C./min).

Laminates of the present invention can be constructed using multiple layers of interlayer of the present invention, and/or can comprise interlayers or film layers of different chemical composition. For example, the interlayers of the present invention can be laminated together with other conventional interlayer materials such as, for example: conventional ionomeric interlayers having from 15 to 20 wt % acid before neutralization can be laminated with the interlayers of the present invention; EVA copolymers; polyurethanes; polyvinyl chloride polymers; or PVB. Laminates of the present invention can comprise adhesive layers to enhance adhesion between the polymeric layers and/or between polymer layers and glass. Conventional adhesives can be useful in the practice of the present invention as optional components. Typically an interlayer of the present invention does not require an adhesive to promote adhesion to glass.

In another embodiment, surprisingly a laminate of the present invention having about 3% haze or less can be obtained by a process comprising a cooling step wherein the laminate is cooled at a rate of less than about 2.75° C./min. Further, the cooling rate of a laminate of the present invention can be slowed to less than about 2° C./min and a laminate having about 3% haze or less can be obtained, and even more surprising, the cooling rate can be slowed to less than 1° C./min to obtain a laminate having about 3% haze or less.

Laminates of the present invention are useful in applications such as: windows in buildings; windshields and sidelites in automobiles, planes, trains and the like; structural support units such as stairs, floors, walls, partitions; other architectural units such as ceilings. Laminates of the present invention can comprise at least one rigid structural layer that is adhered to at least one interlayer obtained from the improved resin composition of the present invention. Preferred are laminates comprising at least one interlayer of the present invention with at least one layer of glass as a rigid structural layer. Laminates of the present invention are particularly useful in applications where safety glass is desirable or required.

EXAMPLES

The following Examples and comparative examples are presented to further illustrate the present invention. The Examples are not intended to limit the scope of the invention in any manner, nor should they be used to define the claims or specification in any manner that is inconsistent with the invention as claimed and/or as described herein.

Test Methods

Haze was determined according to ASTM D1003, and is defined as the percentage of transmitted light that deviates from the incident by more than 2.5 degrees. Haze/Clarity measurements were obtained using a Byk-Gartner Hazegard® Plus (HG Plus).

Interlayer Toughness was determined according to ASTM 1822. This is a tensile impact method that determined the energy to rupture a polymer sheet at high rates of strain that are similar to the rates encountered during impact loading of a glass-interlayer laminate.

Laminate Toughness was determined using a pendulum impact test. An impact test was performed on glass laminates to ascertain the impact energy required to penetrate the laminate (defined as the penetration energy). As a general guideline, a pendulum impactor defined by the Society of Automotive Engineers (SAE) Recommended Practice—J2568 'Intrusion Resistance of Safety Glazing System for Road Vehicles' (known by the industry to be reproducible and accurate) was used. The impactor mass was increased to 31.8-kg from 9.5-kg to allow reasonable impact drop heights to be used. The pendulum was suspended on 6 cables (4-mm diameter) from a height of approximately 5.6 meters. The six-point cable suspension provides for an accuracy of +/−5-mm of the desired impact point. The impactor is fabricated from steel into a 75-mm diameter hemispherical impacting end that was casehardened to prevent damage from repetitive impacts and glass shards. Samples were mounted into a rigid steel support structure allowing for impact perpendicular to the glass surface and preventing the edges of the samples from visibly moving in plane. The 30-cm square laminates were sandwiched between two steel frames with mating neoprene rubber gaskets peripherally holding the outer 22-mm of the laminate. Sufficient clamping was utilized to minimize any slippage of the sample within the supporting frame. Impacts were performed at a variety of impact energies on multiple sets of samples. The penetration energy was then calculated from the results based on a traditional 'stair-case' methodology used widely in the industry.

Laminates from the above impacted set were then submerged into a container of water at room temperature to check for the resiliency and hydrolytic stability of the retention of glass to the interlayer under potentially adverse environmental conditions. The higher percent acid containing interlayers show greater retention of glass fragments after breakage than the lower acid counterparts.

Laminates were peeled at either a 90-degree or a 180-degree angle using an INSTRUMENTORS, Inc., Model SP-102B-3M90 SLIP/PEEL Tester. The laminates were peeled at a rate of 25.4 mm (1 inch) per minute. Peel strength data shown in Table 1 were acquired on laminates made from interlayer sheets that were hot press molded. Peel strength data shown in Table 3 were acquired on laminates made from extruded interlayer sheets.

Glass laminates were prepared by the following method. Sheets of annealed glass 300 mm square by 3-mm thickness were washed with a solution of trisodium phosphate (5 g/liter) in deionized water and then rinsed thoroughly with deionized water and dried. Various polymeric interlayers (see Table below) having a thickness of 0.76 mm were placed on top of the bottom piece of glass. A second lite of similar glass was then placed over this polymer sheet. The preassembly was then held in register by taping together with a few pieces of polyester tape around the periphery to maintain relative positioning of each layer. A nylon fabric strip was then placed around the periphery of the preassembly to facilitate air removal from within the layers. The preassembly was then placed inside a nylon vacuum bag and connected to a vacuum pump. A vacuum was applied to allow substantial removal of air from within (air pressure inside the bag was reduced to below 50 millibar absolute). The prelaminate assembly was then placed into an air autoclave and the pressure and temperature was increased from ambient to 135° C. and 200 psi in a period of 15 minutes. This temperature and pressure was then held for a sufficient period of time to allow the laminate assembly to heat properly (in this case 30 minutes). Next the temperature was decreased to 40° C. within a 20-minute period, 60-minute period or 120-minute period whereby the pressure was then dropped back to ambient. The laminated unit was removed from the autoclave. After autoclaving the laminates were cleaned thoroughly and their haze measured. The determined values are reported in Table 1, below.

Several sheets of an interlayer obtained from resin having 21 wt % methacrylic acid were laminated to glass at either 105° C. or 135° C. in an autoclave. The sheets had moisture content as indicated in Table 2, and the laminates were tested for 180° peel strength.

TABLE 1

| Example | MI Base | wt % Acid in Co-polymer | 90° Peel Strength (lb/inch)$^a$ | % Neutralization | Haze 20 min | 60 min | 120 min |
|---|---|---|---|---|---|---|---|
| C1 | 29.1 | 21.5 | ND$^1$ | 14.1 | 2.42 | 2.83 | 4.96 |
| C2 | 29.1 | 21.5 | 27.8 | 17.1 | 2.42 | 2.50 | 3.82 |
| C3 | 29.1 | 21.5 | 26.1 | 17.9 | 2.28 | 2.54 | 3.56 |
| 1 | 29.1 | 21.5 | 17.0 | 22.1 | 1.88 | 2.18 | 3.07 |
| 2 | 29.1 | 21.5 | 2.4 | 22.4 | 1.78 | 2.01 | 2.98 |
| 3 | 29.1 | 21.5 | 11 | 24 | 1.28 | 1.50 | 2.96 |
| 4 | 29.1 | 21.5 | 14.7 | 28.7 | 1.33 | 1.48 | 2.85 |
| 5 | 29.1 | 21.5 | 11.1 | 28.9 | 1.08 | 1.01 | 1.87 |
| 6 | 29.1 | 21.5 | 11.4 | 31.1 | 1.03 | 0.89 | 1.19 |
| 7 | 29.1 | 21.5 | 12.0 | 32.5 | 0.74 | 0.74 | 1.09 |
| 8 | 29.1 | 21.5 | 4.6 | 34.5 | 0.80 | 0.79 | 0.81 |
| 9 | 60 | 21.5 | 18.4 | 24.8 | 4.02 | 4.73 | 6.18 |
| 10 | 60 | 21.5 | 6.5 | 26 | 4.10 | 4.71 | 6.18 |
| 11 | 60 | 21.5 | 8.7 | 28.7 | 3.52 | 3.55 | 4.67 |
| 12 | 60 | 21.5 | 9.4 | 30.3 | 2.75 | 3.13 | 4.26 |
| 13 | 60 | 21.5 | 8.0 | 32.8 | 2.08 | 2.19 | 2.98 |
| C10 | 60 | 21.5 | 7.2 | 35.3 | 1.76 | 1.72 | 2.63 |
| C11 | 60 | 21.5 | 9.6 | 37.3 | 1.27 | 1.19 | 1.63 |
| C12 | 60 | 21.5 | 5.2 | 39.7 | 1.22 | 1.19 | 1.48 |
| C4 | 60 | 21.5 | 4.8 | 41.1 | 1.62 | 1.04 | 1.56 |
| C5 | 60 | 21.5 | 4.7 | 43.8 | 1.01 | 0.99 | 1.08 |

TABLE 1-continued

| Example | MI Base | wt % Acid in Co-polymer | 90° Peel Strength (lb/inch)[a] | % Neutralization | Haze 20 min | 60 min | 120 min |
|---|---|---|---|---|---|---|---|
| C6 | 60 | 21.5 | 3.9 | 47.5 | 0.90 | 0.92 | 1.04 |
| C7 | 60 | 19 | 5.7 | 37 | 1.57 | 1.64 | 4.76 |
| C8 | 60 | 19 | 6.5 | 36.8 | 1.08 | 1.16 | 3.38 |
| C9 | 60 | 19 | —[1] | 37 | 1.02 | 1.35 | 3.98 |

[a]Peel done at rate of 1 inch per minute.
[1]Adhesion not determined—interlayer tore rather than pulled away from glass.

TABLE 2

| Example | Wt % acid | Moisture (wt %) | Lamination Temp (° C.) | 180° Peel Strength (lb/inch) |
|---|---|---|---|---|
| C10 | 19 | 0.066 | 105 | 2.7 |
| 15 | 21.5 | 0.054 | 105 | 19.3 |
| 16 | 21.5 | 0.494 | 105 | 9 |
| 17 | 21.5 | 0.054 | 135 | 22.6 |
| C10 | 19 | 0.066 | 135 | 3.5 |
| C11 | 19 | 0.407 | 135 | <0.3 |

TABLE 3

| Example | MI Base Resin (g/10 min) | wt % Acid in Co-polymer | % Neutralization | 90-degree Peel Strength (lb/inch) | Tensile Impact Energy, kJ/m² |
|---|---|---|---|---|---|
| C1 | 29.1 | 21.5 | 14.1 | 50.0 | 347 |
| C2 | 29.1 | 21.5 | 17.1 | — | 418 |
| C3 | 29.1 | 21.5 | 17.9 | 45.3 | 404 |
| 1 | 29.1 | 21.5 | 22.1 | 38.3 | 398 |
| 2 | 29.1 | 21.5 | 22.4 | 46.7 | 374 |
| 3 | 29.1 | 21.5 | 24 | 23.9 | 452 |
| 4 | 29.1 | 21.5 | 28.7 | 18.1 | 479 |
| 5 | 29.1 | 21.5 | 28.9 | 26.1 | 511 |
| 6 | 29.1 | 21.5 | 31.1 | 19.2 | 517 |
| 7 | 29.1 | 21.5 | 32.5 | 28.8 | 548 |
| 8 | 29.1 | 21.5 | 34.5 | 20.3 | 672 |
| 9 | 60 | 21.5 | 24.8 | 18.6 | — |
| 10 | 60 | 21.5 | 26 | 7.1 | 380 |
| 11 | 60 | 21.5 | 28.7 | 21.5 | 418 |
| 12 | 60 | 21.5 | 30.3 | 15.5 | 413 |
| 13 | 60 | 21.5 | 32.8 | 15.8 | 438 |
| C10 | 60 | 21.5 | 35.3 | 8.4 | 532 |
| C11 | 60 | 21.5 | 37.3 | 5.4 | 455 |
| C12 | 60 | 21.5 | 39.7 | 5 | 543 |
| C4 | 60 | 21.5 | 41.1 | 5.3 | 520 |
| C5 | 60 | 21.5 | 43.8 | 4.1 | 505 |
| C6 | 60 | 21.5 | 47.5 | 3.1 | — |
| C7 | 60 | 19 | 37 | 6.2 | 323 |
| C8 | 60 | 19 | 36.8 | 9.1 | 488 |
| C9 | 60 | 19 | 37 | 9.7 | — |

TABLE 4

Glass/Polymer Laminate Pendulum Impact Properties

| Sample # | % Acid | MI Base | % Neutralization | Penetration Energy (Joules) |
|---|---|---|---|---|
| 1 | 19.0 | 60.0 | 37.0 | 304 |
| 2 | 21.5 | 29.1 | 24.0 | 324 |
| 3 | 21.5 | 29.1 | 28.7 | 332 |
| 4 | 21.5 | 29.1 | 28.9 | 313 |

TABLE 5

Glass Loss After Pendulum Impact Test

| Sample # | % Acid | MI Base | % Neutralization | Glass Loss (gms.) |
|---|---|---|---|---|
| 1 | 19.0 | 60.0 | 37.0 | 64 |
| 2 | 21.5 | 29.1 | 24.0 | 27 |
| 3 | 21.5 | 29.1 | 28.7 | 36 |
| 4 | 21.5 | 29.1 | 28.9 | 27 |

Hurricane Impact Tests

For architectural uses in coastal areas, a glass/interlayer/glass laminate must pass a simulated hurricane impact and cycling test which measures resistance of the laminate to debris impact and wind pressure cycling. A currently acceptable test is performed in accordance to the South Florida Building Code Chapter 23, section 2315 Impact tests for wind born debris. Fatigue load testing is determined according to Table 23-F of section 2314.5, dated 1994. This test simulates the forces of the wind plus airborne debris impacts during severe weather, e.g., a hurricane.

The test consists of two impacts on the laminate, one in the center of the laminate sample followed by a second impact in a corner of the laminate. The impacts are done by launching a 9-pound (4.1 kilograms) board nominally 2 inches (5 cm) by 4 inches (10 cm) and 8 feet (2.43 meters) long at 50 feet/second (15.2 meters/second) from an air pressure cannon. If the laminate survives the above impact sequence, it is subjected to an air pressure cycling test. In this test, the laminate is securely fastened to a chamber. In the positive pressure test, the laminate with the impact side outward is fastened to the chamber and a vacuum is applied to the chamber and then varied to correspond with the cycling sequences set forth in the following Table A. The pressure cycling schedule, as shown in Table A below, is specified as fraction of a maximum pressure P. Each cycle of the first 3500 cycles and subsequent cycles is completed in about 1-3 seconds. On completion of the positive pressure test sequence, the laminate is reversed with the impact side facing inward to the chamber for the negative pressure portion of the test and a vacuum is applied corresponding to the following cycling sequence. The values are expressed as negative values (−).

TABLE A

| Number of Air Pressure Cycles | Pressure Schedule* | Pressure Range [pounds per square foot (Pascals)] Example given for 70 psf (3352 Pascals) |
|---|---|---|
| Positive Pressure (inward acting) | | |
| 3,500 | 0.2 P to 0.5 P | 14 to 35 (672-1680 Pascals) |
| 300 | 0.0 P to 0.6 P | 0 to 42 (0-2016 Pascals) |
| 600 | 0.5 P to 0.8 P | 35 to 56 (1680-2688 Pascals) |
| 100 | 0.3 P to 1.0 P | 21 to 70 (1008-3360 Pascals) |
| Negative Pressure (outward acting) | | |
| 50 | −0.3 P to −1.0 P | −21 to −70 (−1008 to −3360 Pascals) |
| 1,060 | −0.5 P to −0.8 P | −35 to −56 (−1680 to −2688 Pascals) |
| 50 | 0.0 P to −0.6P | −0 to −42 (0 to −2016 Pascals) |
| 3,350 | −0.2 P to −0.5 P | −14 to −35 (−672 to −1680 Pascals) |

*Absolute pressure level where P is 70 pounds per square foot (3360 Pascals).

A laminate passes the impact and cycling test when there are no tears or openings over 5 inches (12.7 cm) in length and not greater than 1/16 inch (0.16 cm) in width.

Glass laminates used in the hurricane impact tests are prepared in the following manner: All laminates used a 90 mil (2.3 mm) thick interlayer of an ionomer resin (Type 'A') composed of 81% ethylene, 19% methacrylic acid, 37% neutralized with sodium ion and having a final melt index and (Type 'B') composed of 78.5% ethylene, 21.5% methacrylic acid, 32% neutralized with sodium ion and having a final melt index around 0.9. The interlayer was sandwiched between two layers of glass as described below. The ionomer resin interlayer has a StorageYoung's Modulus of about 361 MPa.

All laminates are prepared by placing the interlayer between the glass panels. Each of the glass panels is washed with deionized water. The laminates are placed in an air autoclave at 220 PSIG (1.6 MPa) pressure at 135° C. for 30 minutes. The laminates for the impact testing are 30 inches (77.2 cm) high by 48 inches (121.9 cm) wide. Laminates were then glued into an aluminum frame glazed with a silicone sealant (Dow Corning type 995). This frame was then mounted into a steel supporting frame to conduct the impact test in such a way to minimize movement of the overall glazing. The laminates tested and displayed in Table 6 were impact tested to measure the impact 'toughness' against the timber missile at increased velocities. The laminates of Table 7 were first tested according to the Florida impact and then subjected to the air pressure cycling test sequence. In the impact test a missile of a 9-pound (4.1 kilograms) pine board nominally 2 inches (5 cm) by 4 inches (10 cm) and 8 feet (2.43 meters) long is propelled against the laminate at 50 feet/second (15.2 meters/second) from an air pressure cannon striking the laminate "normal" to its surface. Each of the laminates is subjected to two impacts in two different locations of the laminate, which fractures the glass. The impacts in the center of the laminate were conducted in the standard way (velocity around 50 fps) whereas the velocity of the corner impact was varied to measure the impact 'toughness' of the glazing. The results of the test are shown below in Table 6 below.

Additional samples were prepared in a larger size (1.52-m×2.44-m w/two lites 6 mm Heat-Strengthened Glass laminated with 2.28 mm Ionomer Interlayer) and glazed into a Commercial Aluminum Framing System using silicone sealant and 26 mm glazing overlap to frame. The impacts, both center and corner, were performed at the prescribed 50 fps missile velocity without creating any tears. The air-pressure cycling sequence was then performed to simulate hurricane force wind stressing and flexing of the glazing panels. The results are provided in Table 7.

TABLE 6

| Interlayer Type | Laminated Ionomer Resin IMPACT TEAR LENGTH (cm) VELOCITIES (feet per second) | | | |
| --- | --- | --- | --- | --- |
|  | 50 fps | 55 fps | 60 fps | 65 fps |
| Ionomer 'A' Base Resin MI 60 19% Acid in Copolymer 37% Neutralization | 0 | 12.1 | 15.3 | 29.8 |
| Ionomer 'B' Base Resin MI 30 21.5% Acid in Copolymer 32% Neutralization | 0 | 0 | 10.2 | 27.3 |

Laminated samples were 77.2 cm × 121.9 cm, Interlayer thickness: 2.28 mm

TABLE 7

AIR PRESSURE CYCLING SEQUENCE

|  | POSITIVE PRESSURE INWARD ACTING | | | NEGATIVE PRESSURE OUTWARD ACTING | | |
| --- | --- | --- | --- | --- | --- | --- |
|  | Pressure (lbs/ft$^2$) | Cycles | Result | Pressure (lbs/ft$^2$) | Cycles | Result |
| Ionomer 'A' | 100 | 4500 | Passed | 100 | <18 | Failed |
| Ionomer 'B' | 100 | 4500 | Passed | 100 | 4500 | Passed |
| Ionomer 'B' | 125 | 4500 | Passed | 125 | 4500 | Passed |

Laminated samples were 1.52-m × 2.44-m w/two lites 6 mm Heat-Strengthened Glass laminated with 2.28 mm Ionomer Interlayer glazing into a Commercial Aluminum Framing System using silicone sealant and 26 mm glazing overlap to frame.

What is claimed is:

1. A process for preparing a transparent laminate article comprising an interlayer sheet, the process comprising the steps of:

(a) extruding a thermoplastic resin at a temperature of from 175° C. to 250° C. to obtain said interlayer sheet, wherein (i) the thermoplastic resin consists essentially of copolymerized units of ethylene and from 20 to 23 wt % of copolymerized units of a carboxylic acid monomer selected from acrylic acid or methacrylic acid, wherein 20% to 35% of the acid groups are neutralized; and the thermoplastic resin has a melt index of about 60 g/10 min or less prior to neutralization; and (iii) the interlayer sheet has a moisture level of 0.066 wt % or less; and b) fabricating a laminate from the interlayer sheet by (1) setting up the interlayer sheet and at least one other laminate layer to form a pre-laminate assembly and (2) heating the pre-laminate assembly to a temperature of at least 120° C. and applying pressure or vacuum to the assembly for a period of time to form a laminate assembly and (3) cooling the laminate temperature to a temperature of 40° C. at a rate of less than 1.0° C./min to obtain the transparent laminate article; wherein the transparent laminate article has a haze of 3% or less and a peel strength is from 16 to 47 lbs/inch when measured at an angle of 90° and at a peel rate of 1 inch/min; and further wherein said interlayer sheet has an adhesion to glass of at least 200 J/m$^2$, when measured by Double-Cantilever Beam testing; and said interlayer sheet has an impact toughness of at least 300 kJ/m$^2$, when measured according to ASTM 1822.

2. The process of claim 1, wherein the pre-laminate assembly is heated to a temperature of at least about 130° C.

3. The process of claim 1, wherein the interlayer sheet has a thickness of from about 0.38 to about 2.60 mm.

* * * * *